F. SCHUH.
WATER CLOSET.
APPLICATION FILED APR. 30, 1913.
1,134,914.
Patented Apr. 6, 1915.
2 SHEETS—SHEET 2.
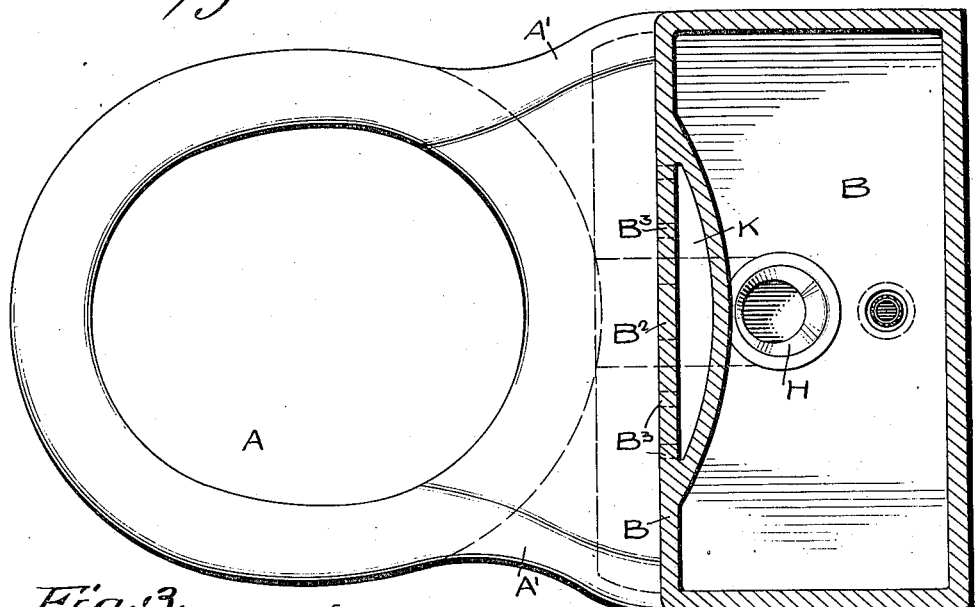
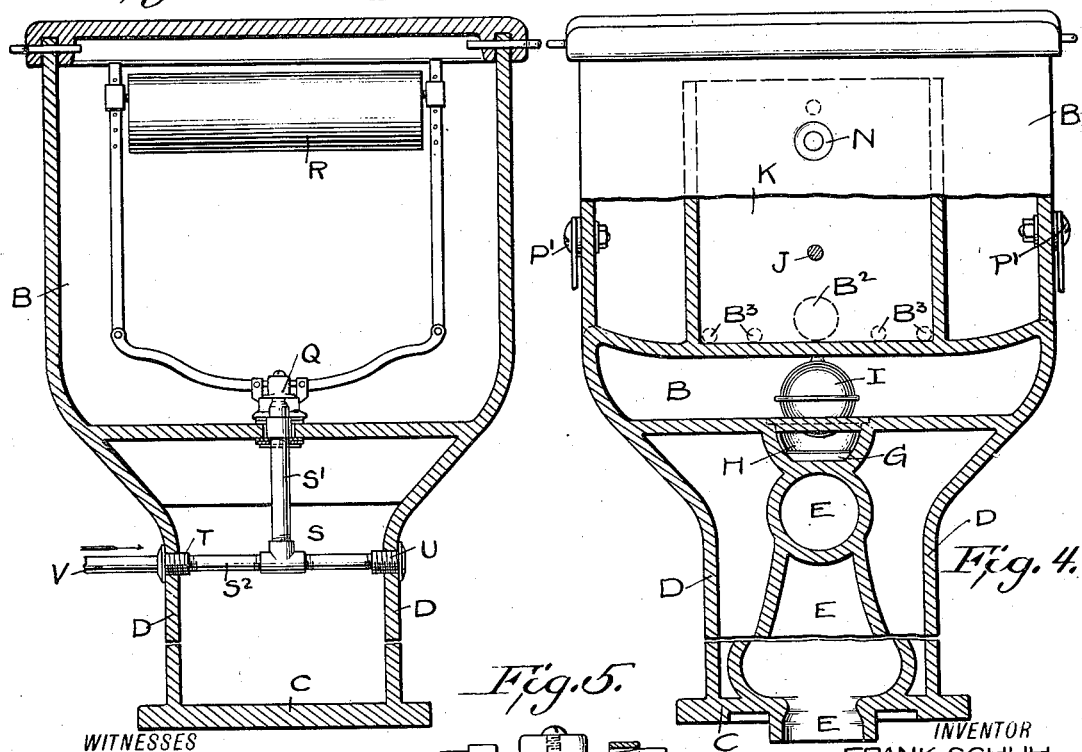
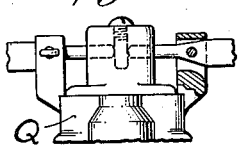
INVENTOR
FRANK SCHUH,
BY
ATTORNEYS

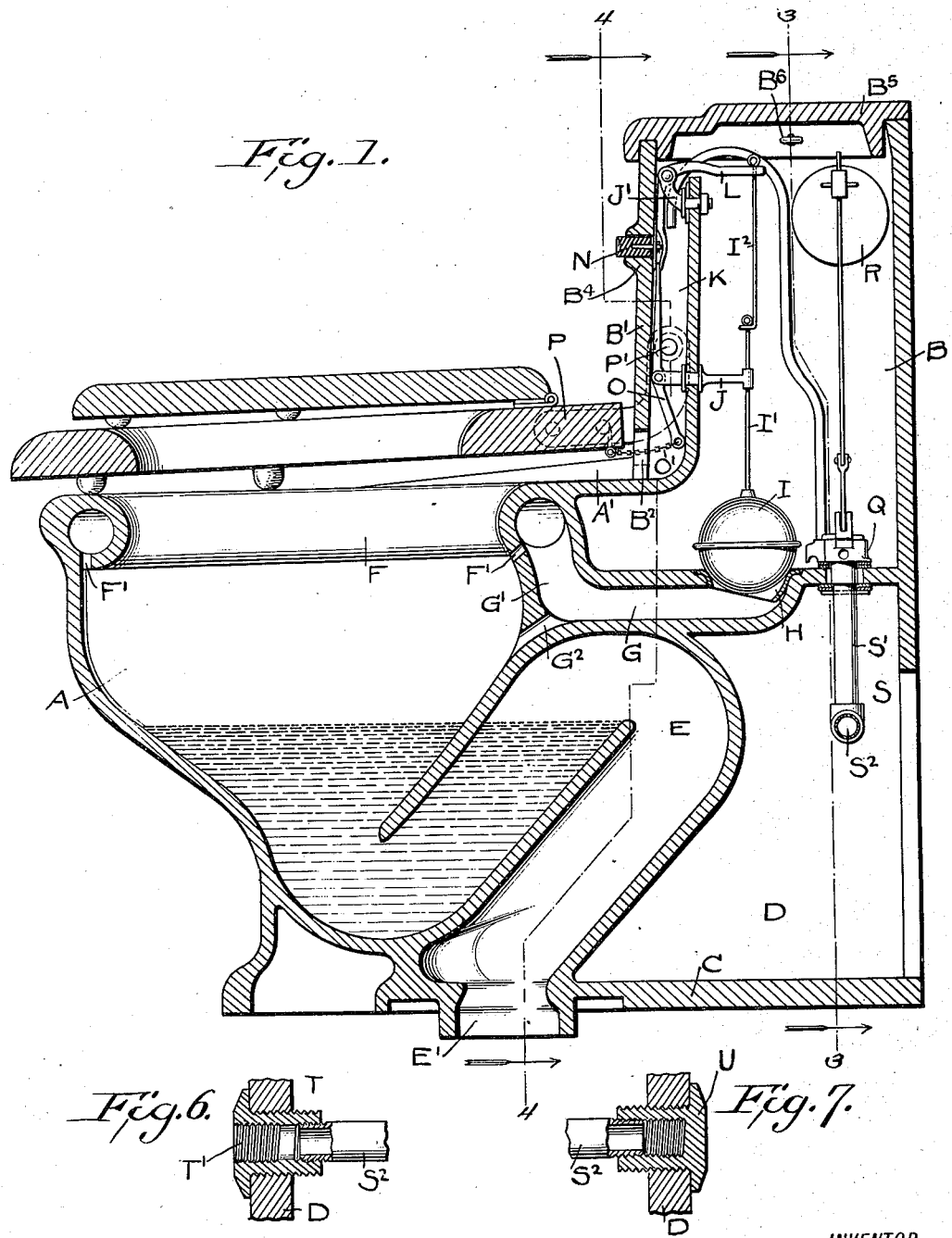

UNITED STATES PATENT OFFICE.

FRANK SCHUH, OF ALBANY, NEW YORK.

WATER-CLOSET.

1,134,914. Specification of Letters Patent. Patented Apr. 6, 1915.

Application filed April 30, 1913. Serial No. 764,568.

*To all whom it may concern:*

Be it known that I, FRANK SCHUH, a citizen of the United States, and a resident of Albany, in the county of Albany and State of New York, have invented a new and Improved Water-Closet, of which the following is a full, clear, and exact description.

The object of the invention is to provide a new and improved water closet arranged to combine the bowl and tank in one single integral structure, to render the water closet exceedingly sanitary, to avoid leakage, to insure an effective flushing of the bowl and draining of the accumulated moisture or overflow.

For the purpose mentioned use is made of a bowl and a water supply tank integral with the bowl and in communication therewith. Use is also made of an overflow integral with the tank and within the same and leading to the opening of the bowl.

A practical embodiment of the invention is represented in the accompanying drawings forming a part of this specification, in which similar characters of reference indicate corresponding parts in all the views.

Figure 1 is a sectional side elevation of the water closet; Fig. 2 is a plan view of the same with the tank in section and the seat, the inlet and outlet valves and their operating mechanisms omitted; Fig. 3 is a reduced transverse section of the water closet on the line 3—3 of Fig. 1; Fig. 4 is a similar view of the same on the line 4—4 of Fig. 1; Fig. 5 is a side elevation of the float-controlled inlet valve, parts being in section; and Figs. 6 and 7 are enlarged side elevations of the interchangeable plugs for the supply pipe.

The bowl A and the water supply tank B are made of a single piece of porcelain, earthenware or other similar suitable material, the bowl A and the tank B having a common integral base C, and the tank B having integral side legs D merging at their lower ends with the base C. The bowl A is provided with the usual water-sealed outlet E having its terminal E' merging with the base C, as plainly shown in Figs. 1 and 4. The bowl A is further provided with an integral flushing rim F having perforations F' opening into the bowl to flush the same with water passing through the perforations F' from the rim F. The rear end of the rim F is connected with the upward extension G' of a channel G formed integrally with the bowl A and the tank B, and the rear end of the channel G is provided with a valve seat H located in the bottom of the tank B and opening into the same. The valve seat H is depressed and the bottom of the tank B is approximately horizontal so that the water contained in the tank B readily drains through the valve seat H, which latter is open to prevent sediment from settling in the bottom of the tank B.

The valve seat H is controlled by a valve I provided with an upwardly-extending stem I' mounted to slide in a suitable bracket J, attached to the wall of an overflow K arranged integrally within the tank B at the front B' thereof, so that any excess of water in the tank B can pass into the overflow K and down the same through large and small openings $B^2$, $B^3$ formed in the front B' of the tank B. The openings $B^2$ and $B^3$ lead to a channel flanked by ledges or ribs A' formed integrally on the top of the bowl A at the sides thereof and merging with the front B' of the tank B, as plainly indicated in Figs. 1 and 2. It will be noticed that by this arrangement water overflowing into the overflow K passes by way of the openings $B^2$, $B^3$ into the channel on top of the bowl A and leading into the opening of the bowl at the rim F, so that the water drains into the bowl. It will also be noticed that any moisture accumulating on the outer surface of the front B' of the tank B can readily drain into the said channel to finally flow into the bowl A by way of its top opening.

The upper end of the stem I' of the valve I is connected by a link $I^2$ with the rear end of a bell crank lever L fulcrumed on a bracket J' attached to the wall of the overflow K. The vertical member of the bell crank lever L extends into the overflow K and is engaged by the inner end of a push button N mounted to slide in a suitable bearing $B^4$ arranged on the front B' of the tank B. When it is desired to flush the bowl, it is only necessary to press the push button N so that a swinging motion is given to the bell crank lever L which now lifts the valve I off the seat H to allow the water contained in the tank B to flow by way of the valve seat H, channel G and extension G' into the flushing rim F to finally pass by way of the perforations F' into the bowl A to flush the same. When the pressure on the button N is released the valve returns by its own weight to its normal position on the valve seat H to close the latter.

In order to drain the channel G and its extension G' of water to prevent freezing thereof in cold weather, use is made of a drain opening G² extending through the rear wall of the bowl and leading to the bottom of the channel G, as plainly indicated in Fig. 1, thus any water contained in the channel G is drained out of the same by way of the drain opening G², which latter also directs the water into the bowl during the flushing operation.

The inverted member of the lever L is engaged by the upper end of a second lever O extending within the overflow K and fulcrumed on the bracket J previously mentioned, the lower end of the lever O being connected by a chain O' with the seat P pivoted at P' on the sides of the tank B. The chain O' extends through the opening B² previously mentioned, so that when the seat P is swung upward into an open position a pull is exerted by the chain O' on the lever O to impart a swinging motion to the latter and consequently to the lever L to lift the valve I off its seat. When this takes place the water from the tank B flushes the bowl A, as previously explained.

The inlet valve Q for supplying the tank B with water is attached to the bottom of the tank B and this valve Q is controlled by a float R and is preferably of the construction shown and described in the application for Letters Patent No. 668,939, filed by me April 6, 1912, so that further description of the same is not deemed necessary. The water supply pipe S for the valve Q is provided with a vertical member S' and a horizontal member S², of which the vertical member S' is connected at its upper end to the valve Q, while the lower end of the vertical member connects with the horizontal member S². The ends of the latter screw in plugs T and U screwing in the side legs D, the plug U being a closing plug, as plainly shown in Fig. 7, to close this end of the member S², while the other plug T is provided with a threaded opening T' for connection with the water service pipe V. By the arrangement described, the plugs T and U can be interchanged in the side legs D to connect at the other side of the water closet with the service pipe V. The upper end of the tank B is preferably closed by a cover B⁵ locked in place by removable pins B⁶ to permit access to the tank and the mechanism contained therein for repairs or other purposes. By reference to Figs. 1 and 2 it will be noticed that the back of the tank B is straight to permit of snugly fitting the water closet against the wall.

From the foregoing, it will be seen that by the arrangement described a sanitary fixture is provided owing to the fact that the bowl and the tank are connected integrally with each other, thus preventing leakage and insuring proper draining of the parts and so avoiding the accumulation of sediment and the like.

Having thus described my invention, I claim as new and desire to secure by Letters Patent:

1. A water closet provided with a bowl and a water supply tank integral with the bowl, the bowl having an integral sealed outlet and an integral flushing rim, and the tank having its bottom below the rim of the bowl and provided with a valve seat therein, a channel being formed between the bottom of the tank and the outlet of the bowl, and having an upwardly projecting extension, said channel leading from the rim of the bowl to the valve seat and provided with an opening at the base of its extension leading into the bowl.

2. A water closet provided with a bowl and a water supply tank forming an integral part of the bowl, the bowl having an integral water-sealed outlet and an integral flushing rim connected with a channel, a valve seat in the bottom of the tank and leading to the said channel, a manually-controlled valve controlling the said valve seat, and an overflow integral with and at the front of the tank and discharging above the top of the bowl into the opening of the said bowl.

3. A water closet provided with a bowl, a water supply tank forming an integral part of the said bowl and in communication therewith, and an overflow integral within the tank at the front wall thereof, the said front wall having an opening leading to the bottom of the overflow, and the top of the said bowl being provided at the rear with a channel connecting with the said opening to conduct the overflow water into the top of the bowl.

4. A water closet, comprising a bowl, a water supply tank extending above the bowl and having an overflow on the inner face of the front wall of the tank, the said front wall having openings therein leading into the overflow, and a channel on the upper rear face of the bowl into which the said openings discharge.

In testimony whereof I have signed my name to this specification in the presence of two subscribing witnesses.

FRANK SCHUH.

Witnesses:
ERNEST C. FASOLDT,
WM. C. MASON.